US010607792B2

(12) United States Patent
Wilkening et al.

(10) Patent No.: US 10,607,792 B2
(45) Date of Patent: Mar. 31, 2020

(54) DISCONNECTING DEVICE FOR GALVANIC DIRECT CURRENT INTERRUPTION

(71) Applicant: Ellenberger & Poensgen GmbH, Altdorf (DE)

(72) Inventors: Ernst-Dieter Wilkening, Braunschweig (DE); Hendrik-Christian Koepf, Braunschweig (DE); Dirk Boesche, Seershausen (DE)

(73) Assignee: Ellenberger & Poensgen GmbH, Altdorf (DE)

(*) Notice: Subject to any disclaimer, the term of this patent is extended or adjusted under 35 U.S.C. 154(b) by 216 days.

(21) Appl. No.: 15/494,931

(22) Filed: Apr. 24, 2017

(65) Prior Publication Data

US 2017/0229256 A1    Aug. 10, 2017

Related U.S. Application Data

(63) Continuation of application No. PCT/EP2015/068590, filed on Aug. 12, 2015.

(30) Foreign Application Priority Data

Oct. 24, 2014   (DE) .................. 10 2014 015 643

(51) Int. Cl.
*H01H 9/30*  (2006.01)
*H01H 9/54*  (2006.01)
(Continued)

(52) U.S. Cl.
CPC ............... *H01H 9/30* (2013.01); *H01H 9/54* (2013.01); *H01H 9/542* (2013.01);
(Continued)

(58) Field of Classification Search
CPC ............ H01H 9/30; H01H 9/54; H01H 9/542; H01H 33/596; H01H 2009/546; H01H 2009/544; H02H 3/20
See application file for complete search history.

(56) References Cited

U.S. PATENT DOCUMENTS 5,652,688 A    7/1997  Lee
7,079,363 B2   7/2006  Chung
(Continued)

FOREIGN PATENT DOCUMENTS

CN    1153988 A     7/1997
CN    102349124 A   2/2012
(Continued)

OTHER PUBLICATIONS

Chinese Office Action dated May 30, 2018 in corresponding application 201580057012.0.

*Primary Examiner* — Rexford N Barnie
*Assistant Examiner* — Thai H Tran
(74) *Attorney, Agent, or Firm* — Muncy, Geissler, Olds & Lowe, P.C.

(57) ABSTRACT

A disconnecting device for interrupting a direct current between a direct current source and an electric apparatus, having a current-conducting mechanical switch, a power electronics unit connected thereto, and an energy store which is charged by an arcing voltage generated on the switch by an arc as the switch is being disconnected. A pulse generator that is connected to the energy store triggers at least one semiconductor switch of the power electronics unit in such a way that the power electronics unit short-circuits the switch and the arc is extinguished.

17 Claims, 7 Drawing Sheets

(51) Int. Cl.
*H02H 3/20* (2006.01)
*H01H 33/59* (2006.01)

(52) U.S. Cl.
CPC ............ *H01H 33/596* (2013.01); *H02H 3/20* (2013.01); *H01H 2009/544* (2013.01); *H01H 2009/546* (2013.01)

(56) References Cited

U.S. PATENT DOCUMENTS

| | | |
|---|---|---|
| 8,742,828 B2 | 6/2014 | Naumann et al. |
| 2007/0109025 A1* | 5/2007 | Liu .................. H03K 17/04123 327/63 |
| 2010/0254046 A1 | 10/2010 | Liu et al. |
| 2012/0007657 A1* | 1/2012 | Naumann ............... H01H 9/542 327/434 |
| 2012/0218676 A1* | 8/2012 | Demetriades .......... H01H 9/542 361/115 |

FOREIGN PATENT DOCUMENTS

| | | |
|---|---|---|
| DE | 103 15 982 A1 | 11/2003 |
| DE | 102 25 259 B3 | 1/2004 |
| DE | 20 2008 010 312 U1 | 11/2008 |
| FR | 2 738 664 A1 | 3/1997 |
| JP | 2012521620 A | 9/2012 |
| WO | WO 02/071429 A1 | 9/2002 |
| WO | WO 2010/108565 A1 | 9/2010 |

\* cited by examiner

DISCONNECTING DEVICE FOR GALVANIC DIRECT CURRENT INTERRUPTION

This nonprovisional application is a continuation of International Application No. PCT/EP2015/068590, which was filed on Aug. 12, 2015, and which claims priority to German Patent Application No. 10 2014 015 643.5, which was filed in Germany on Oct. 24, 2014, and which are both herein incorporated by reference.

BACKGROUND OF THE INVENTION

Field of the Invention

The invention relates to a disconnecting device for direct current interruption between a direct current source and an electrical apparatus, comprising a current-conducting mechanical switch and a power electronics unit connected thereto, and an energy store, which is charged by an arcing voltage generated on the switch by an arc as the switch is being disconnected. In this case, a direct current source is understood to be a photovoltaic generator (PV generator, solar system), and an electrical apparatus is, in particular, an inverter.

Description of the Background Art

From DE 20 2008 010 312 U1, a photovoltaic system (PV system) or a solar system with a so-called photovoltaic generator is known, which in turn has solar modules which are combined into groups of partial generators, which in turn are connected in series or are present in parallel strings, wherein the direct current power of the photovoltaic generator is fed into an alternating voltage network via an inverter. Since as a result of the system, a PV system continuously provides, on the one hand, an operating current and an operating voltage in the range between 180V (DC) and 1500V (DC), and since on the other hand, for example for installation, assembly or service purposes or in particular for general personal protection, reliable separation of the electrical components or devices from the photovoltaic system acting as a direct current source is desired, a corresponding disconnecting device must be capable of performing an interruption under load, i.e. without previously switching off the direct current source.

For load separation, a mechanical switch (switching contact) can be used with the advantage that a galvanic separation of the electrical apparatus (inverter) from the direct current source (photovoltaic system) is produced when the contact has been interrupted. If, on the other hand, power semiconductor switches are used for load separation, unavoidable power losses occur in the semiconductors even during normal operation. In addition, no galvanic separation and therefore no reliable personal protection is ensured with such power semiconductors.

DE 102 25 259 B3 discloses a plug connector designed as a load breaker which, in the manner of a hybrid switch, comprises a semiconductor switching element in the form of, for example, a thyristor in the housing of the inverter, and main and auxiliary contacts which are connected to photovoltaic modules. The main contact leading in an unplugging operation is connected in parallel with the trailing auxiliary contact, which is connected in series with the semiconductor switching element. In this case, the semiconductor switching element is controlled for purposes of arc prevention or arc suppression by periodically switching it on and off.

A hybrid electromagnetic direct current switch with an electromagnetically actuated main contact and an IGBT (insulated gate bipolar transistor) can also be provided as a semiconductor switch for direct current interruption (DE 103 15 982 A2). However, such a hybrid switch has an external energy source for operating a power electronics unit with a semiconductor switch.

WO 2010/108565 A1, which corresponds to U.S. Pat. No. 8,742,828, discloses a hybrid disconnecting switch with a mechanical switch or disconnecting element, and a semiconductor electronics which is connected in parallel therewith and which essentially comprises at least one semiconductor switch, preferably an IGBT. The semiconductor electronics does not have an additional energy source and, with the mechanical switch closed, is current-blocking, that is to say virtually current-free and voltage-free. The semiconductor electronics gains the energy required for its operation from the disconnecting device, that is, from the breaker system itself, for which purpose the energy of the arc arising when the mechanical switch is opened is used. In this case, the semiconductor electronics is connected to the mechanical switch on the trigger side in such a way that the arcing voltage switches the semiconducting electronics in a conducting manner via its switching contacts as a result of the arc.

As soon as the semiconductor electronics is switched to conduct current, the arc current starts to commutate from the mechanical switch to the semiconductor electronics. The corresponding arcing voltage or the arc current in this case charges an energy store in the form of a capacitor, which discharges specifically to produce arc-free switching-off of the semiconductor electronics, whilst generating a control voltage. The predetermined time duration or time constant and thus the charging duration of the energy store or capacitor determines the duration of the arc. Following the charging process, a timing element starts, during which the semiconductor electronics is controlled arc-free and current-blocking. The time duration of the timer is set to a secure deletion.

SUMMARY OF THE INVENTION

It is therefore an object of the invention to provide a particularly suitable disconnecting device (hybrid switch or electronics) for direct current interruption between a direct current source, for example, a photovoltaic generator, and an electrical apparatus, for example, an inverter, with the highest possible switching capacity and in particular the highest possible drive speed, i.e. very fast control of the power electronics unit of the disconnecting device.

In an exemplary embodiment, a disconnecting device, which can also be referred to below as a hybrid switch, has a current-conducting mechanical switch and a power electronics unit connected thereto, as well as an energy store, which is charged by an arcing voltage generated on the switch by an arc as the switch is being disconnected. The hybrid switch further comprises a pulse generator, which is also referred to in the following as a pulse generator circuit, which is connected to the energy store, which can be designed as a capacitor. The pulse generator controls the at least one semiconductor switch of the power electronics unit in such a way that it short-circuits the switch, which leads to the extinction of the arc.

In an embodiment, the pulse generator (the pulse generator circuit) comprises a semiconductor switch which is connected to the energy store and is switched to conducting when the charging voltage of the energy store reaches a set or adjustable voltage value, which is also referred to hereinafter as operating voltage. This semiconductor switch of the pulse generator is suitably a thyristor. On a voltage tap connected downstream of this semiconductor switch of the pulse generator, on the control side, the power electronics unit taps a control pulse, preferably generated by the operating voltage. In other words, the pulse generator is connected on the control side via this voltage tap to the control side of the power electronics unit, i.e. to the at least one semiconductor switch, so that the latter is activated when the control pulse or control signal of the pulse generator is switched, i.e. is switched to conducting, and then short-circuits the mechanical switch, in particular its switching contacts or its corresponding contact connections. The pulse generator generates only a single control pulse per switching operation, that is, a single pulse.

In an embodiment, the pulse generator has a capacitor connected to the energy store. This capacitor, which is connected, for example, to a discharge resistor, is preferably used as a timer, or triggers a timer, after which lapse of time a shutdown, that is to say, a switching off of the control pulse and, consequently, the power electronics unit, takes place.

In addition, the pulse generator comprises a semiconductor circuit with, for example, a plurality of semiconductor switches which are connected to further components, for example, resistors, and to at least one Zener diode. Suitably, the pulse generator comprises at least one thyristor and at least one transistor (bipolar transistor, MOS-transistor, PMOS-transistor). In conjunction with the capacitor of the pulse generator, the semiconductor circuit causes the control pulse, which is present at the voltage tap, to be switched off when, as a result of charging the capacitor of the pulse generator, the switching voltage of a semiconductor switch, which can be in the form of a MOS-transistor or PMOS-transistor and is connected to the voltage tap, is achieved.

In an embodiment of the power electronics unit, this has a first and a second semiconductor switch in each case in the form of an IGBT with a free-wheeling diode. These semiconductor switches are switched into a first or a second current path, to which a first or second switching connection of the mechanical switch is connected. Diodes are suitably connected to these current paths, which together with the free-wheeling diodes serve to rectify the arcing voltage. By means of the two semiconductor switches, the power electronics unit can be used bi-directionally, and, independently of the potential (positive or negative) at the respective switching connection of the mechanical switch, both semiconductor switches are always controlled.

The power electronics unit are suitably assigned a driver stage with transistors connected to a complementary output stage, which are connected on the collector-emitter side to the energy store and are connected on the base side to the voltage tap of the pulse generator. This output stage acts as a current amplifier when the pulse generator delivers the control pulse to the control inputs (bases) of the driver transistors. This results in a quick recharging of the IGBTs of the power electronics unit, which in turn allows for a particularly fast switching process. Suitably, the capacitor of the driver circuit provides the recharge current.

The, or each, semiconductor switch of the power electronics unit is connected in a suitable development (collector-base side) with a series circuit comprising a resistor and a diode. The potential between the diode and the resistor corresponds to the forward voltage of the semiconductor switch (IGBT), plus the saturation voltage of the diode. With this series circuit serving as a measuring circuit, knowledge of the semiconductor or IGBT characteristic can be used to make a statement about the current flow by means of the semiconductor switch, that is to say, by the corresponding power semiconductor. In this way, overcurrent detection is provided without an additional current measuring element in the form of, for example, a cost-intensive shunt. A protective circuit, which preferably comprises this series or measuring circuit, or also a separate protective circuit, switches off the control pulse of the pulse generator when the collector-emitter voltage of the semiconductor switch (IGBT) of the power electronics unit exceeds a threshold value.

In the case of two semiconductor switches (IGBTs), two such protective circuits, preferably including a measuring circuit (series circuit having a diode and resistor), are provided for the respective IGBTs. The respective protective circuit causes a short-term, that is to say a sufficiently fast, switching-off of the power electronics unit in order to switch off the IGBTs for their protection in the event of a fault within preferably 10 μs.

The separation device can comprises a power supply connected to the power electronics unit with at least one semiconductor switch in the form of an IGBT, which is connected to the energy store, said switch suitably being connected to a further semiconductor switch (NPN transistor) as well as to resistors and at least one Zener diode, and which for charging the energy store is controlled by means of the arcing voltage and—after reaching the operating voltage—by means of the subsequent charge interruption.

By means of the pulse generator, which can produces only one single pulse per switching operation, a very fast control of the power electronics unit of a hybrid disconnecting device is achieved, and thus its switching capacity is particularly high, that is to say increased as compared to known disconnecting devices. In addition, by means of the protective circuit, a reliable overcurrent detection of the power electronics unit is made possible with a concurrent cost-saving measuring device in the form of the series connection of the diode and resistor. Furthermore, a particularly compact circuit configuration of the power electronics unit is made possible.

The disconnecting device according to the invention can also be provided for direct current interruption in the DC voltage range up to 1500V (DC). In the preferred use of the additional mechanical disconnector, this autonomous, hybrid disconnecting device is therefore particularly suitable for reliable and non-contact galvanic direct current interruption between a photovoltaic system and an associated inverter as well as in connection with, for example, a fuel cell system or an accumulator (battery).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
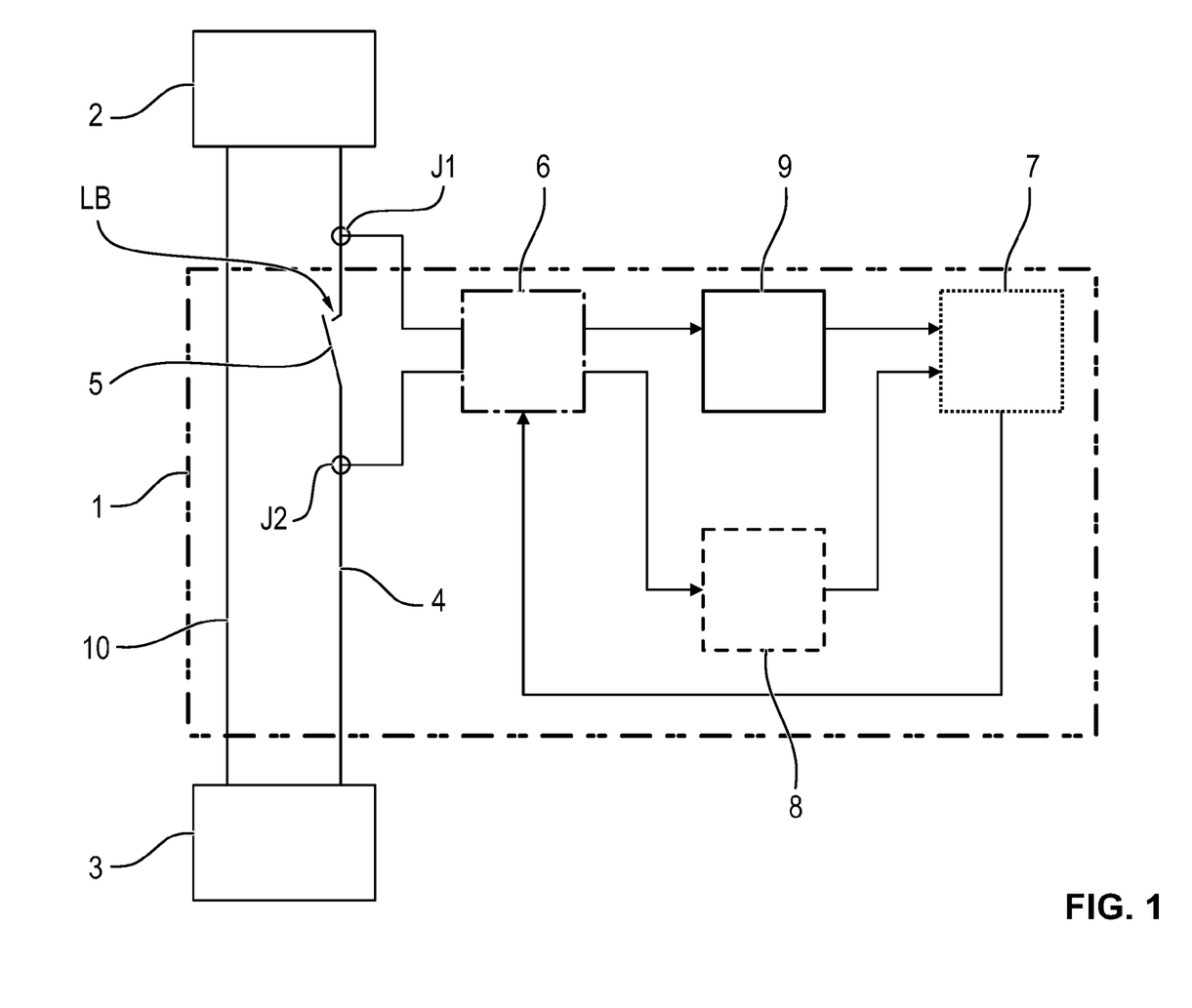
FIG. 1 is a block circuit diagram of a hybrid disconnecting device arranged between a photovoltaic generator and an inverter, with a mechanical switch and a power electronics unit including a protective circuit, as well as a pulse generator and a power supply.

FIG. 1 schematically shows a disconnecting device 1, which is connected in the exemplary embodiment between a photovoltaic generator 2 and an inverter 3. The photovoltaic generator 2 can, in a manner not shown in detail, comprise a number of solar modules 4, which are connected to one another in parallel to a common generator connection box, which basically serves as an energy collection point.

In the main current path 4, which represents the positive pole, the disconnecting device 1 comprises a switching contact 5, which is referred to hereinafter as a mechanical switch, and a power electronics unit 6 connected in parallel therewith, and a pulse generator 7 which drives the latter. The disconnecting device 1 also comprises a protective circuit 8 and a power supply 9. The mechanical switch 5 and the power electronics unit 6 as well as the pulse generator 7 driving them form an autonomous hybrid circuit breaker (hybrid switch). A further hybrid circuit breaker can be connected in a non-illustrated manner in the return line 10, which represents the negative pole of the disconnecting device 1—and thus of the overall system. Mechanically coupled switching contacts of a further mechanical disconnecting element can be arranged between the photovoltaic generator 2 and the inverter 3 in the lead line (main path) 4, which represents the positive pole, and in the return line 10, for a complete galvanic separation or direct current interruption.

If the mechanical switch 5, which then has current flowing through, is opened during operation, an arc LB forms between its switching contacts. By means of the arcing voltage caused thereby, a capacitor C9 (FIGS. 2 and 6) is charged as an energy store via the switching connections J1 and J2 shown in FIG. 1. As soon as its charging voltage reaches a certain voltage value, the pulse generator 7 activates the power electronics unit 6, whereupon it short-circuits the switch 5 and the arc LB extinguishes.

Figure 2:
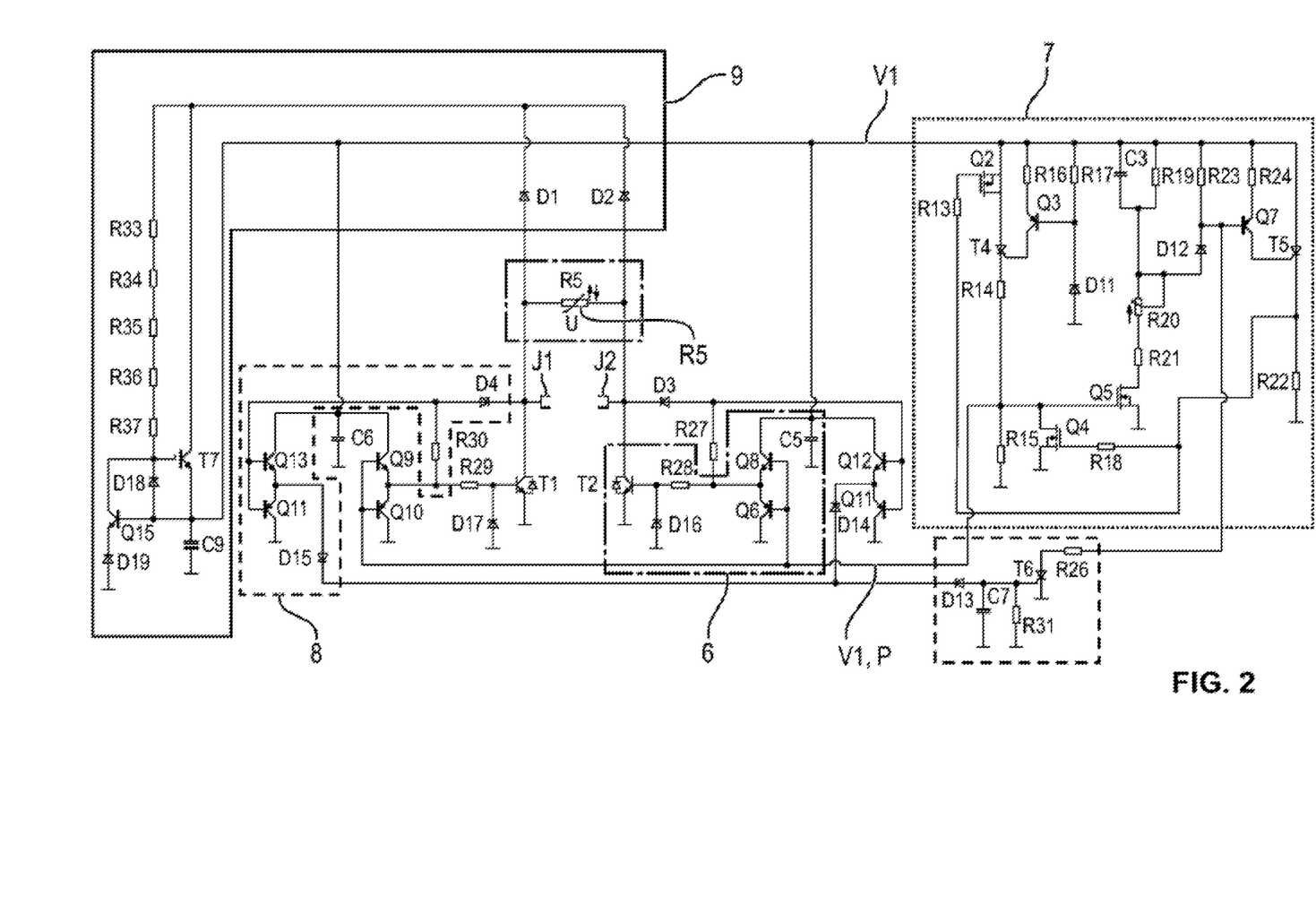
FIG. 2 is a detailed circuit diagram of the disconnecting device with two semiconductor switches of the power electronics unit and its driver and protective circuits as well as the pulse generator and the power supply with a capacitor as an energy store.
Figure 4:
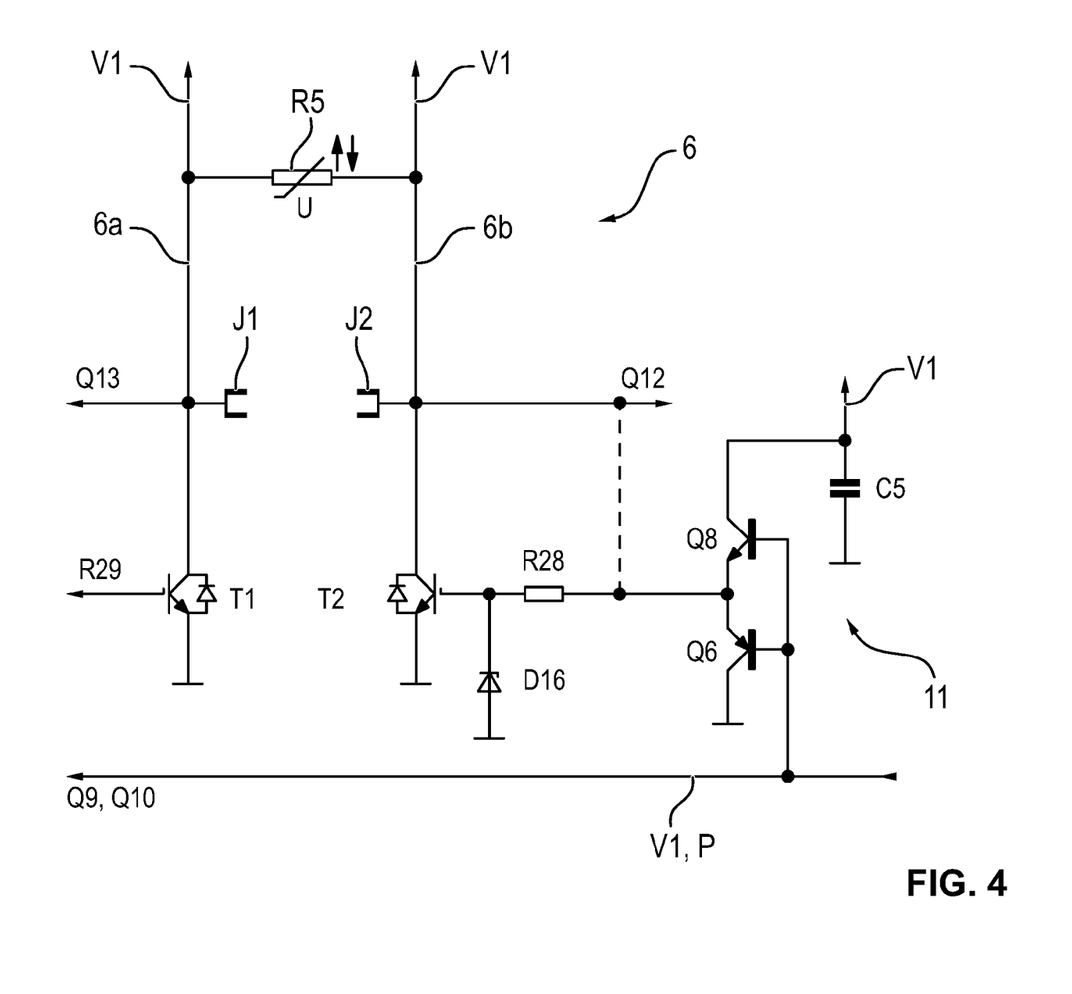
FIG. 4 illustrates the power electronics unit with the drive output stage of one of the semiconductor switches as well as two contact connections of the mechanical switch as partial circuit of the hybrid disconnecting device.

The power electronics unit 6 thereby suitably remains switched on for a certain time, i.e., for a set or adjustable time element, in order to enable a deionizing of the switching path. After the time period or the corresponding time element has elapsed, the pulse generator 7 switches off the power electronics unit 6. An overvoltage occurring during the switching process is limited by a varistor R5 (FIGS. 2 and 4). During the switching process, the protective circuit 8 monitors the respective power semiconductor (IGBT) T1, T2 of the power electronics unit 6 in order to avoid its destruction by an impermissibly high current.

FIG. 2 shows the disconnecting device 1 in a detailed circuit diagram, wherein there, the different line types used in FIG. 1 frame the components of the power electronics unit 6, of the pulse generator, of the protective circuit 8 and of the power supply 9. Since the power electronics unit 6 preferably has two semiconductor switches in the form of the shown IGBTs T1 and T2, two protective circuits 8 and two driver circuits for the IGBTs T1 and T2 are also provided. For the sake of better clarity, only one of these circuits with its components is bordered by the corresponding line type. The individual sub circuits are shown separately in FIGS. 3 to 6.

Figure 3:
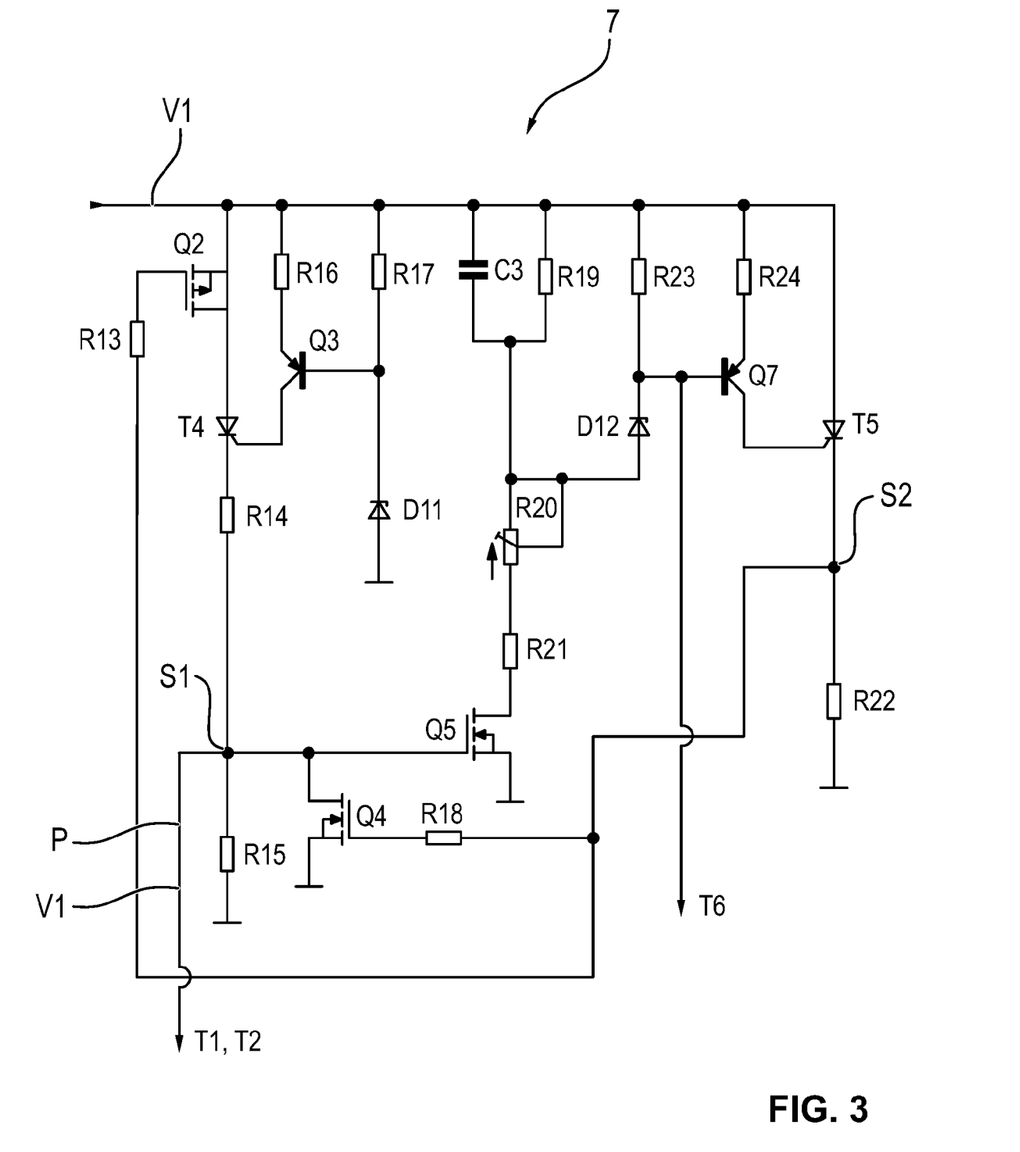
FIG. 3 illustrates the pulse generator as a partial circuit of the hybrid disconnecting device.

According to FIGS. 2 and 3, the pulse generator 7 comprises a semiconductor switch in the form of a thyristor T4, which is connected to the capacitor C9 via the connection V1. The latter is connected on the anode side via a PMOS-transistor (P-channel metal-oxide-semiconductor transistor) Q2, i.e., via the collector-emitter path of the latter to the V1 leading to the capacitor C9. The thyristor T4 is connected on the control side via a PMOS-transistor Q3 which is connected to resistors R16 and R17 as well as to a Zener diode D11. On the cathode side, the thyristor T4 is connected via a resistor R14 to a voltage tap S1, which is connected to ground via a resistor R15. Furthermore, the voltage tap S1 is connected to ground via the drain-source path of a further transistor Q4, in the present case an NMOS or bipolar transistor. At the voltage tap S1, there is also the base or the gate of a further transistor (NMOS or bipolar transistor) Q5, which collector-emitter path is connected via resistors R19, R20 as variable resistors and R21, as well as via a capacitor C3, which is connected in parallel with the resistor R19 between the connection V1 connected to the capacitor C9 and ground.

In parallel with the RC element R19 and C3, a series circuit composed of a resistor R23 and a Zener diode D12 is arranged, to which the base of a PNP transistor Q7 is connected on the cathode side. The control side of a further thyristor T5 is connected via the transistor Q7 and a resistor R24 to the connection V1 connected to the capacitor C9. The anode-cathode path of the thyristor T5 is connected to ground between the connection V1 connected to the capacitor C9 and—via a resistor R22. A cathode-side tap of this thyristor T5 is connected to the gate (base) of the transistor Q4 via a resistor R18 and to the gate (base) of the transistor Q2 via a resistor R13. The circuit shown and described constitutes, in addition to the semiconductor switch T4, a correspondingly connected semiconductor circuit of the pulse generator 7. The pulse generator 7 generates the or each control pulse P for the two IGBTs T1, T2 of the power electronics unit 6, as explained below.

The two thyristors T4 and T5 of the pulse generator 7 are initially in the blocking state so that the gate of the transistor Q2 is at ground potential. If the charging voltage of the capacitor C5 and thus the operating voltage increases as a result of an arc LB arising during the disconnecting of the mechanical switch 5, the negative gate-source voltage of the transistor Q2 also rises, so that the latter is switched through and the anode of the thyristor T4 has the potential of the operating voltage. If this voltage continues to rise, the Zener diode D1 begins to go into the conducting state. The resulting current flow causes a voltage drop across resistor R17. If this voltage drop exceeds the threshold value of the base-emitter voltage of transistor Q3, the latter becomes conductive. In order to protect the transistor Q3 from being destroyed, the current is limited by the resistor R16. This current leads to an ignition of the thyristor T4. The value of the resistor R14 is substantially smaller than that of the resistor R15 so that the potential between these two resistors R14, R15 at the voltage tap S1, at which the control pulse P is tapped for the power electronics unit 6, is only slightly below the operating voltage.

As soon as the thyristor T4 has fired, the transistor Q5 turns on and the capacitor C3 is charged via the resistors R20 and R21. Since the capacitor C3 is initially uncharged, the potential of the anode of the Zener diode D12 is at operating voltage. By charging the capacitor C3, the potential shifts to ground. If this potential has decreased such that the Zener diode D12 becomes conductive, a current will flow through the resistor R23. If the voltage drop across this resistor R23 exceeds the threshold value of the base-emitter voltage of the PNP-transistor Q7, then the latter switches through. The resistor R24 provides a current limitation and protects the transistor Q7.

The current flowing through the transistor Q7 leads to the ignition of the thyristor T5 so that the potential at its cathode rises to the operating voltage minus the forward voltage. Thus, the transistor Q4 also turns on and pulls the potential between the resistors R14 and R15 at the voltage tap S1 to ground. In addition, transistor Q2 now blocks and causes the thyristor T4 to turn off. Thus, the transistor Q5 also blocks and the capacitor C3 is discharged via the resistor R19. The thyristor T5 remains conductive until the capacitor C9 is discharged. Since the capacitor is recharged during an arcing phase and also during the switching overvoltage, only a single control pulse is triggered.

The power electronics unit 6 shown in FIGS. 2 and 4 is assigned a driver stage 11. The IGBTs T1 and T2 of the power electronics unit 6 form the lower part of a B2 rectifier bridge. By using two power semiconductors with freewheeling diode in the form of the IGBTs T1 and T2, a bidirectionally usable circuit is achieved. If the illustrated switch or contact connection J2 of the mechanical switch 5 has a positive potential and the other contact connection J1 a negative potential, the current can flow through the IGBT T2 and the free-wheeling diode of the IGBT T1. In the case of a reversed polarity, a current flow through the IGBT T1 and the free-wheeling diode of the IGBT T2 is possible. Since the control signal of an IGBT has no influence on its inverse operation, both IGBTs T1 and T2 of the power electronics unit 6 are always controlled.

Since the driver circuits 11 of both IGBTs T1 and T2 are identically constructed, only one of the two driver circuits 11 is described below. The driver circuit 11 comprises an NPN-transistor Q8 and a PNP-transistor Q6, which are connected to a complementary output stage. If the pulse generator 7 emits the control pulse P to the bases of the two transistors Q6 and Q8, they act as a current amplifier and enable a quick recharge of the gate of the respective IGBT T2, T1. This results in a particularly rapid switching process. A capacitor C5 of the driver circuit 11 provides the recharge current. The IGBT T2 is attenuated by a resistor R28 since, due to parasitic inductances and capacitances, oscillations can occur during the control of the respective IGBT T2. A Zener diode D16 of the driver circuit 11 protects the gate of the IGBT T2 from surges, if oscillations should still occur. Since due to the steep switching edge of the IGBT T2 overvoltages can occur when switching inductive loads, the varistor R5 limits the overvoltage in order to prevent destruction of the power semiconductors T1, T2.

Figure 5:
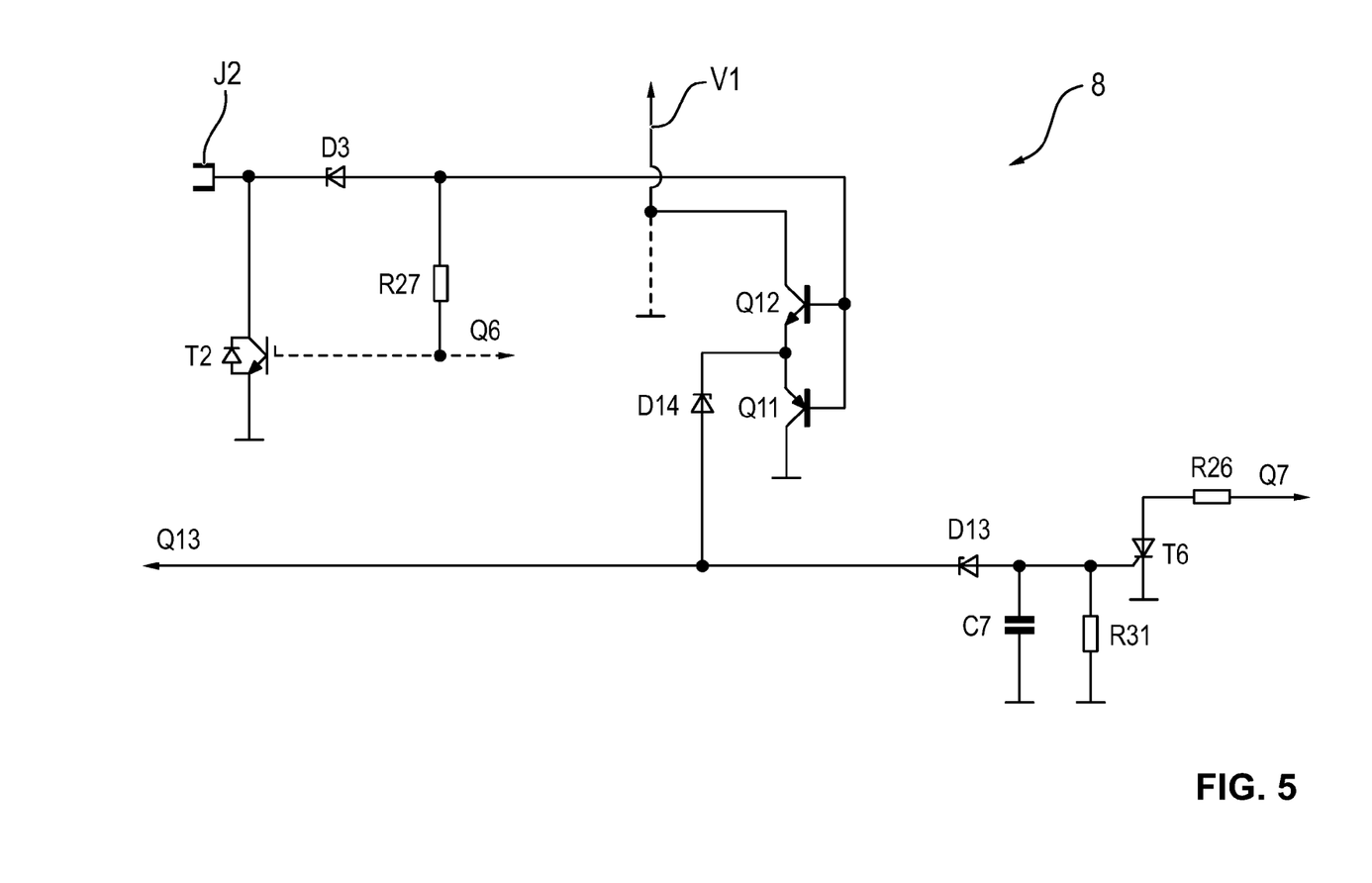
FIG. 5 illustrates the protective circuit with a measuring circuit for overcurrent detection as a partial circuit of the hybrid disconnecting device.

FIGS. 2 and 5 show the measuring and protective circuit 8 of the disconnecting device 1. Although IGBTs as a semiconductor switch of the power electronics unit 6 are in principle short-circuit-proof, they must nevertheless be switched off in the event of a fault within 10 μs. The circuits 8 for monitoring or measuring the current of the two IGBTs T1, T2 are of identical construction, so that FIG. 5 again shows only one such circuit 8. The measuring circuit essentially comprises a series circuit having a resistor R27 and a diode D3 connected between the gate and the collector of the IGBT T2. The control signal of the IGBT T2 is applied to its collector-emitter path via the resistor R27 and the diode D3.

The potential between the diode D3 and the resistor R27 corresponds to the forward voltage of the IGBT T2, plus the saturation voltage of the diode D3. Thus, knowing the IGBT characteristic, a statement can be made about the current flow through this power semiconductor T2. In order not to unnecessarily discharge the capacitor C9 as energy store during the switching phase, the resistor R27 is relatively high-resistance. In order to nevertheless enable rapid switching off in the event of a fault, a complementary output stage with correspondingly connected transistors Q11 and Q12 is connected downstream. A diode D14 connected on the emitter side to the output stage allows the two measuring circuits D3, R27 and D4, R28 (FIG. 2) to be connected in parallel.

When the collector-emitter voltage of the IGBT T2 exceeds a certain potential, a thyristor T6 of the protective circuit 8 is triggered. The transistor Q7 of the pulse generator 7 is thereby turned on, thus initiating the switching-off operation. A capacitor C7 connected to ground on the control side of the thyristor T6 and a resistor R31 connected in parallel therewith form a filter in order, inter alia, to prevent the protective circuit 8 from tripping during the switch-on phase of the IGBT T2. The tripping voltage can be determined using the following formula:

$$U_{CE}(T2) \geq U_{BE}(Q12) + U_D(D14) + U_Z(D13) + U_{zü}(T6) - U_D(D3),$$

wherein $U_{CE}$ is the collector-emitter voltage, $U_{BE}$ is the base-emitter voltage, $U_D$ is the forward voltage, $U_Z$ is the Zener voltage, and $U_{zü}$ is the ignition voltage.

Figure 6:
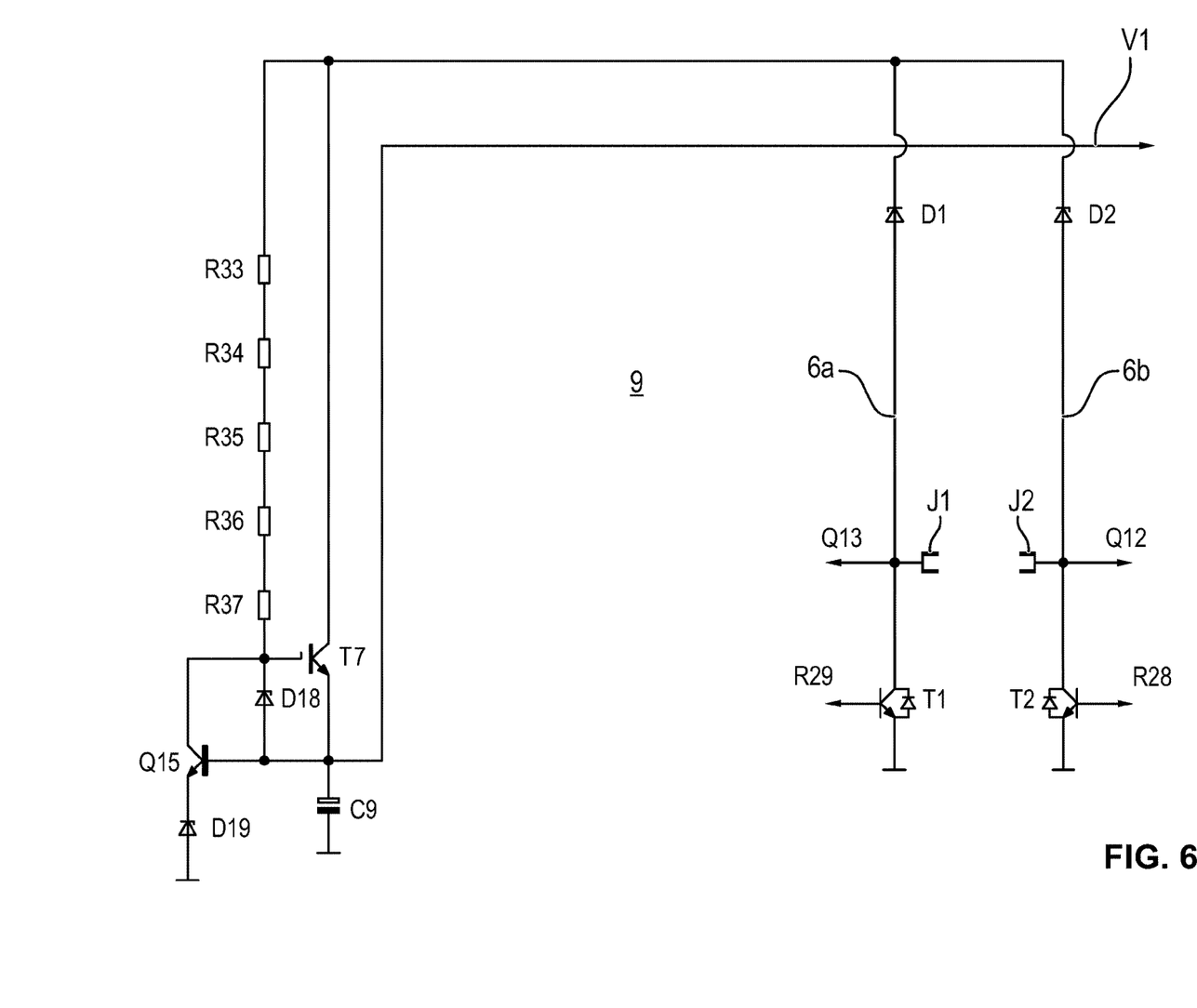
FIG. 6 illustrates the power supply with a rectifier circuit as a partial circuit of the hybrid disconnecting device.

FIGS. 2 and 6 show the circuit configuration of the power supply 9 of the disconnecting device 1. The power supply 9 serves to charge the capacitor C9 as an energy store and for protection against a switching overvoltage. The mechanical switch 5 (FIG. 1) is located between the switch or contact connections J1 and J2. As soon as the switch 5 opens the circuit, the arc LB is formed. The arcing voltage is rectified via diodes D1, D2 connected in current paths 6a and 6b of the semiconductor switches (circuit breaker) T1 and T2 of the power electronics unit 6 and via the free-wheeling diodes of the IGBTs T1 and T2, respectively.

The power supply 9 comprises a semiconductor switch in the form of an IGBT T7, of which the gate is charged via resistors R33 to R37. As soon as the gate-emitter potential of the thyristor T7 is above the threshold voltage, IGBT T7 turns on and the capacitor C9 is charged. Connected to the IGBT T7 is an NPN-transistor Q15 in the manner shown in FIG. 6. On the emitter side, the transistor Q15 is connected to ground via a Zener diode D11. When the potential of the capacitor C9 reaches the value of the Zener diode D19 plus the base-emitter threshold voltage of the transistor Q15, the latter becomes conductive and limits the gate-emitter voltage of the IGBT T7. The transistor then begins to block and the charging current of the capacitor C9 is interrupted. The Zener diode D19 also protects the gate of the IGBT T7 and the transistor Q15 from overvoltage.

Figure 7:
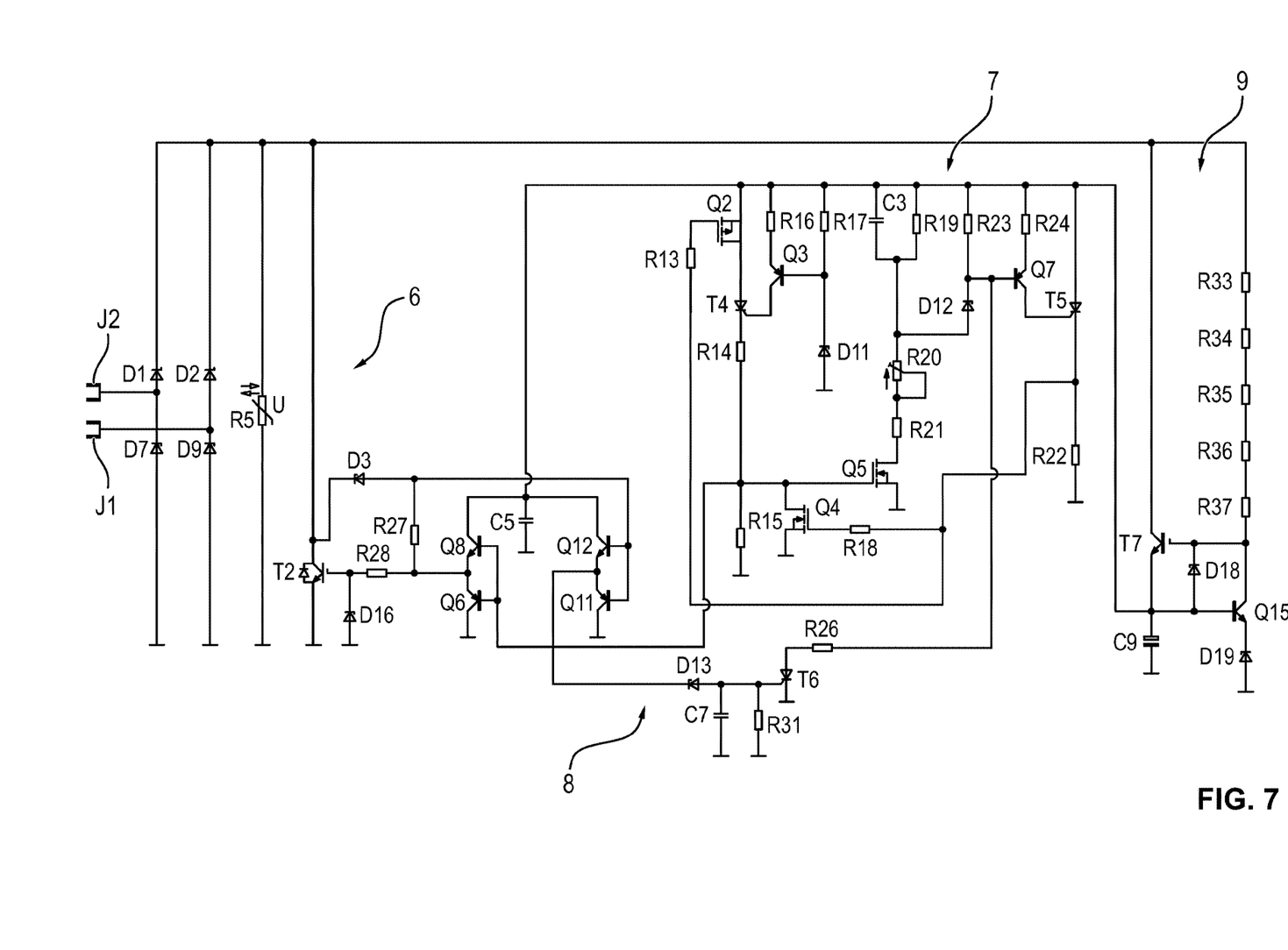
FIG. 7 is a circuit diagram according to FIG. 2 of a hybrid disconnecting device with an alternative rectifier circuit.

The disconnecting device 1 can also be operated with an upstream rectifier. A corresponding circuit is shown in FIG. 7. The individual sub circuits of the power supply 9, the pulse generator 7 of the measuring and protective circuit 8, and, in principle, the power electronics unit 6, can be seen unchanged. In addition to the IGBT T2 as semiconductor switch of the power electronics unit 6, the diodes D1-D4 inserted in the circuit shown in FIG. 7 must be able to carry the entire current. In addition, the forward voltage in the switched-on state is comparatively high due to the series circuit of three semiconductors.

The invention is not limited to the embodiments described above. Rather, other variants of the invention can also be derived from those skilled in the art without departing from the scope of the invention. In particular, all the individual features described in connection with the exemplary embodiments can also be combined with one another in a different manner without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A disconnecting device for a direct circuit interruption between a direct current source and an electrical apparatus, the disconnecting device comprising:
   a current-conducting mechanical switch;
   a power electronics unit connected to the current-conducting mechanical switch;
   an energy store that is adapted to be charged by an arcing voltage generated on the current-conducting mechanical switch by an arc as the current-conducting mechanical switch is being disconnected;
   a pulse generator connected to the energy store, the pulse generator being adapted to trigger at least one semiconductor switch of the power electronics unit such that the power electronics unit short-circuits the current-conducting mechanical switch and the arc is extinguished; and
   a voltage tap connected to the pulse generator,
   wherein the power electronics unit comprises a current amplifier configured to enable the at least one semiconductor switch, and
   wherein the pulse generator comprises a semiconductor switch that is connected to the energy store and is connected upstream of the voltage tap.

2. The disconnecting device according to claim 1, wherein the pulse generator switches to conducting when a charging voltage of the energy store reaches a set operating voltage or an adjustable operating voltage.

3. The disconnecting device according to claim 2, wherein the semiconductor switch of the pulse generator is a thyristor.

4. The disconnecting device according to claim 1, wherein, on a control side, the power electronics unit taps a control pulse generated from a charging voltage of the energy store or from an operating voltage at the voltage tap of the pulse generator.

5. The disconnecting device according to claim 1, wherein the pulse generator or the semiconductor switch thereof, blocks an output of a control pulse for the power electronics unit when the current-conducting mechanical switch is disconnected.

6. The disconnecting device according to claim 1, wherein the power electronics unit has a first semiconductor switch or an IGBT with a free-wheeling diode, which is connected into a first current path, which is connected to a first switching connection of the current-conducting mechanical switch, and
   wherein the power electronics unit has a second semiconductor switch or an IGBT with a free-wheeling diode, which is connected into a second current path to which a second switching connection of the current-conducting mechanical switch is connected.

7. The disconnecting device according to claim 1, wherein the power electronics unit has a driver stage with transistors connected to a complementary output stage, which are connected to the energy store on a collector-emitter side and are connected on a base side to the voltage tap of the pulse generator.

8. The disconnecting device according to claim 1, wherein the at least one semiconductor switch of the power electronics unit is connected on a collector-base side by a series circuit having a resistor and a diode, which is connected to a protective circuit, which switches off a control pulse of the pulse generator when a collector-emitter voltage of the at least one semiconductor switch of the power electronics unit exceeds a threshold value.

9. The disconnecting device according to claim 1, wherein the pulse generator has a capacitor connected to the energy store and, in addition to the semiconductor switch of the pulse generator connected upstream of the voltage tap, has a semiconductor circuit, which turns off a control pulse at the voltage tap when due to charging of the capacitor, a switching voltage of a semiconductor switch of the semiconductor circuit, which is connected to the voltage tap, is reached.

10. The disconnecting device according to claim 1, further comprising a power supply connected to the power electronics unit, with the at least one semiconductor switch of the power electronics unit, which is connected to the energy store, and which is activated for charging the energy store and, upon reaching an operating voltage, for subsequently terminating a charging process.

11. The disconnecting device according to claim 1, further comprising a rectifier circuit for rectifying the arcing voltage.

12. The disconnecting device according to claim 11, wherein the rectifier circuit comprises at least two diodes to form a rectifier bridge.

13. The disconnecting device according to claim 11, further comprising:
   a protective circuit having a varistor, the varistor being connected to the at least one semiconductor switch.

14. The disconnecting device according to claim 1, wherein the current amplifier comprises two transistors connected in series.

15. The disconnecting device according to claim 1, further comprising:
   an upstream rectifier connected to the energy store for rectifying the arcing voltage.

16. A method comprising:
   disconnecting, by a current-conducting mechanical switch, a connection between a direct current source and an electrical apparatus;
   charging, with an energy store, an arcing voltage generated on the current-conducting mechanical switch when the current-conducting mechanical switch is disconnected; and
   triggering, by a pulse generator connected to the energy store, a first semiconductor switch of a power electronics unit to short-circuit the current-conducting mechanical switch and extinguish an arc generated on the current-conducting mechanical switch, wherein the first semiconductor switch is enabled by a current amplifier of the power electronics unit, and wherein the pulse generator comprises a second semiconductor switch that is connected to the energy store and is connected upstream of a voltage tap of the pulse generator.

17. A system comprising:
a direct current source;
an electrical apparatus;
a disconnecting device for a direct circuit interruption between the direct current source and the electrical apparatus, the disconnecting device comprising:
   a current-conducting mechanical switch;
   an energy store adapted to be charged by an arcing voltage generated on the current-conducting mechanical switch by an arc as the current-conducting mechanical switch is being disconnected;
   a pulse generator connected to the energy store, the pulse generator being adapted to trigger a first semiconductor switch to short-circuit the current-conducting mechanical switch and extinguish the arc;
   a power electronics unit connected to the current-conducting mechanical switch, the power electronics unit comprising a current amplifier configured to enable the first semiconductor switch; and
   a voltage tap connected to the pulse generator,
wherein the pulse generator comprises a second semiconductor switch that is connected to the energy store and is connected upstream of the voltage tap.

\* \* \* \* \*